(12) United States Patent
Henriet et al.

(10) Patent No.: US 9,333,815 B2
(45) Date of Patent: May 10, 2016

(54) MULTI-FREQUENCY TIRE PRESSURE MONITORING DETECTOR

(71) Applicant: Schrader Electronics Limited, Antrim (GB)

(72) Inventors: Nicolas Henriet, Arcon (FR);
Emmanuel Marguet, Arcon (FR); Ian Barrett, Antrim (GB)

(73) Assignee: Schrader Electronics Ltd., Antrim (IE)

( * ) Notice: Subject to any disclaimer, the term of this patent is extended or adjusted under 35 U.S.C. 154(b) by 105 days.

(21) Appl. No.: 14/253,495

(22) Filed: Apr. 15, 2014

(65) Prior Publication Data

US 2014/0306815 A1 Oct. 16, 2014

Related U.S. Application Data

(60) Provisional application No. 61/811,995, filed on Apr. 15, 2013.

(51) Int. Cl.
*B60C 23/00* (2006.01)
*B60C 23/04* (2006.01)
*H04B 1/04* (2006.01)

(52) U.S. Cl.
CPC ......... *B60C 23/0452* (2013.01); *B60C 23/0455* (2013.01); *B60C 23/0462* (2013.01); *B60C 23/0471* (2013.01); *B60C 23/0479* (2013.01); *H04B 1/0458* (2013.01)

(58) Field of Classification Search
CPC ............ B60C 23/0452; B60C 23/0455; B60C 23/0462; B60C 23/0471; B60C 23/0479; H04B 1/0458
USPC .................................................. 340/442, 447
See application file for complete search history.

(56) References Cited

U.S. PATENT DOCUMENTS

| 8,692,661 | B2 * | 4/2014 | Deniau | B60C 23/0408 116/34 R |
|---|---|---|---|---|
| 2009/0033480 | A1 * | 2/2009 | Tanemura | B60C 23/0433 340/447 |
| 2012/0044064 | A1 * | 2/2012 | Maekawa | B60C 23/0408 340/447 |

* cited by examiner

*Primary Examiner* — Kerri McNally
(74) *Attorney, Agent, or Firm* — Holland & Hart LLP

(57) ABSTRACT

Methods, systems, and devices are provided for tire pressure detectors that may operate according to one of two or more selectable frequencies. Tire pressure detectors may include an RF section to modulate pressure information from a pressure sensor onto an output signal. The frequency of the output signal may be selectable from two or more frequencies based on a frequency required by a vehicle that the tire pressure detector is to be used with. An RF matching circuit may be coupled between the RF section and an antenna, with an impedance of the RF matching circuit selected based of the frequency of the output signal. Such impedance matching may provide a constant power level output from the tire pressure detector independent of the frequency of the tire pressure detector transmissions.

15 Claims, 7 Drawing Sheets

500

MULTI-FREQUENCY TIRE PRESSURE MONITORING DETECTOR

CROSS REFERENCE TO RELATED APPLICATIONS

This application claims priority to U.S. Provisional Patent Application No. 61/811,995, filed on Apr. 15, 2013, entitled "Multi-Frequency Tire Pressure Monitoring Detector" which is hereby incorporated by reference into this application.

FIELD

The present disclosure relates generally to tire pressure detectors, and, more particularly, to tire pressure detectors capable of RF communications using different frequencies.

BACKGROUND

In a vehicle, a tire pressure detector may be used in conjunction with a Tire Pressure Monitoring System (TPMS) to measure air pressure in tires. Tires having low tire pressure may raise safety concerns and may also reduce operating efficiency of a vehicle. The tire pressure detector may be attached to a tire, or the wheel on which the tire is mounted, and may detect low tire pressure. Upon detection, the tire pressure detector may transmit this information to a vehicle operator via a TPMS or the like. The transmission of the tire pressure information is often performed wirelessly. For instance, a radio frequency transmission may be used to transmit tire pressure detector readings.

In a tire pressure detector, sensors in addition to a pressure sensor such as a temperature sensor and/or a speed sensor may be included. A battery also may be used to power components of the tire pressure detector. The tire pressure detector may also include communication components such as a phase locked loop (PLL) circuit, a crystal oscillator, an RF antenna that sends radio transmissions to a central control unit and possibly receives radio transmissions, etc. A power amplifier may also be included such that tire pressure signals may be amplified for transmission.

Traditional TPMS technology has developed several unique sensor designs for multiple different customers for such devices (e.g., different automobile manufacturers, etc.). Such an arrangement works well for supplying the particular customers with their components, but can lead to complications in the aftermarket. For example, when supplying spare parts to the aftermarket, such different designs require a retailer to stock multiple part numbers to be able to service all the different vehicle makes. For tire pressure detectors, for example, different information may be sent by a detector, and different frequencies may be used, based on the particular vehicle make and/or model. For example, common tire pressure detector designs use final transmitted frequencies of 315 MHz or 433.92 MHz, depending upon the particular vehicle make/model. Some replacement parts may allow for a tire pressure detector to be programmed by the retailer to provide appropriate information and data according to one of various different formats, thereby reducing the number of parts a retailer may have to stock. However, while the data that such a tire pressure detector transmits can be programmed, the frequency at which it transmits is fixed by the design of the electronics. Therefore, the retailer needs to buy and stock a 315 MHz sensor and a 433.92 MHz sensor.

SUMMARY

Methods, systems, and devices for tire pressure detectors that may operate according to one of two or more selectable frequencies are provided. Tire pressure detectors of various embodiments may include an RF section to modulate pressure information from a pressure sensor onto an output signal. The frequency of the output signal may be selectable from two or more frequencies based on a frequency required by a vehicle that the tire pressure detector is to be used with. An RF matching circuit may be coupled between the RF section and an antenna, with an impedance of the RF matching circuit selected based of the frequency of the output signal. Such impedance matching may provide a constant power level output from the tire pressure detector independent of the frequency of the tire pressure detector transmissions.

According to one aspect of the disclosure, an apparatus for tire pressure detection is provided. The apparatus generally includes a pressure sensor configured to output a pressure signal, a control module communicatively coupled with the pressure sensor and configured to modulate information related to the pressure signal onto an output signal, the output signal having a frequency that is selectable from at least a first frequency and a second frequency, an RF matching circuit coupled with the control module, and an antenna coupled with the RF matching circuit. In some examples, the RF matching circuit has an impedance that is selectable from based on the frequency of the output signal, and the control module may include a switch that is configured to switch the impedance of the RF matching circuit to the selected impedance. In other examples, the apparatus also includes a reference oscillator that outputs a reference signal at a predetermined frequency, and the control module includes an RF sub-module configured to receive the reference signal and generate the output signal based on a multiplier applied to the reference signal, the value of the multiplier selectable from at least a first multiplier value corresponding to the first frequency and second multiplier value corresponding to the second frequency. At least one of the first multiplier value and the second multiplier value may be a non-integer value, and the RF sub-module may include a fractional-N Phase Locked Loop (PLL) circuit.

According to another aspect of the disclosure, a method for frequency selection in a tire pressure detector is provided. The method generally includes determining an operating frequency at which the tire pressure detector is to transmit RF signals, determining a protocol that is to be used to communicate information from the tire pressure detector, configuring a frequency switch in the tire pressure detector based on the determined operating frequency, and programming the tire pressure detector to communicate information according to the determined protocol. The method may also include, according to some examples, selecting an RF matching circuit to be used in RF signal transmission from the tire pressure detector responsive to the determined operating frequency. The selected RF matching circuit may maintain a predetermined power output of the RF signal transmission independent of the determined operating frequency. One or more of determining the operating frequency or determining the protocol, according to some examples, may include determining a make and model of a vehicle associated with the tire pressure detector, and determining the operating frequency and/or protocol based on the make and model of the vehicle.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices for tire pressure detectors that may operate according to one of two or more selectable frequencies are provided. Tire pressure detectors of various embodiments may include an RF section to modulate pressure information from a pressure sensor onto an output signal. The frequency of the output signal may be selectable from two or more frequencies based on a frequency required by a vehicle that the tire pressure detector is to be used with. An RF matching circuit may be coupled between the RF section and an antenna, with an impedance of the RF matching circuit selected based of the frequency of the output signal. Such impedance matching may provide a constant power level output from the tire pressure detector independent of the frequency of the tire pressure detector transmissions.

It is to be understood that the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
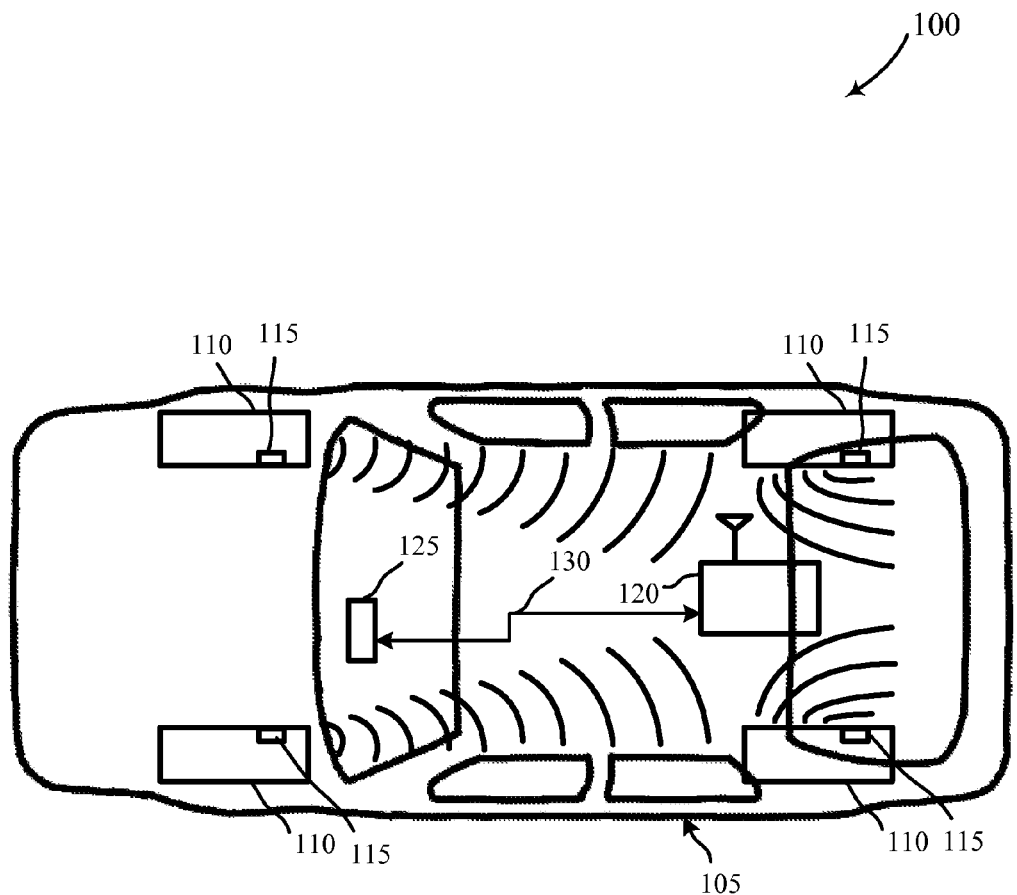
FIG. 1 is an illustration of an exemplary vehicle and tire pressure detectors in accordance with various embodiments.

Referring first to FIG. 1, a diagram 100 illustrates an example of a vehicle 105 having tires 110 that are each equipped with a tire pressure monitoring detector 115. A central controller or body control module (BCM) 120 receives signals from each tire pressure monitoring detector 115 and may determine whether any of the associated tires have a tire pressure that is outside of certain predefined alarm limits. Tire pressure monitoring detectors 115, as is well known, may communicate sensed pressure information through RF communications to the central controller 120. Central controller 120 may communicate tire pressure information and/or an alarm indication to an operator interface 125 through a communication interface 130 such as a controller area network (CAN) bus, for example.

According to various embodiments, tire pressure monitoring detectors 115 are configured to operate according to one of multiple selectable frequencies for communication with central controller 120. For example, as discussed above, depending upon the make and model of the vehicle 105, different information may be sent by a tire pressure monitoring detectors 115, and different frequencies may be used for the RF communication that transmits this information. Tire pressure monitoring detectors 115 in one example are configurable to use final transmitted frequencies of 315 MHz or 433.92 MHz, depending upon the particular vehicle make/model. Furthermore, tire pressure monitoring detectors 115 may be configurable to provide appropriate information and data according to one of various different formats and/or protocols, depending upon the particular vehicle make/model. Thus, the number of replacement parts a retailer may have to stock may be reduced.

Figure 2:
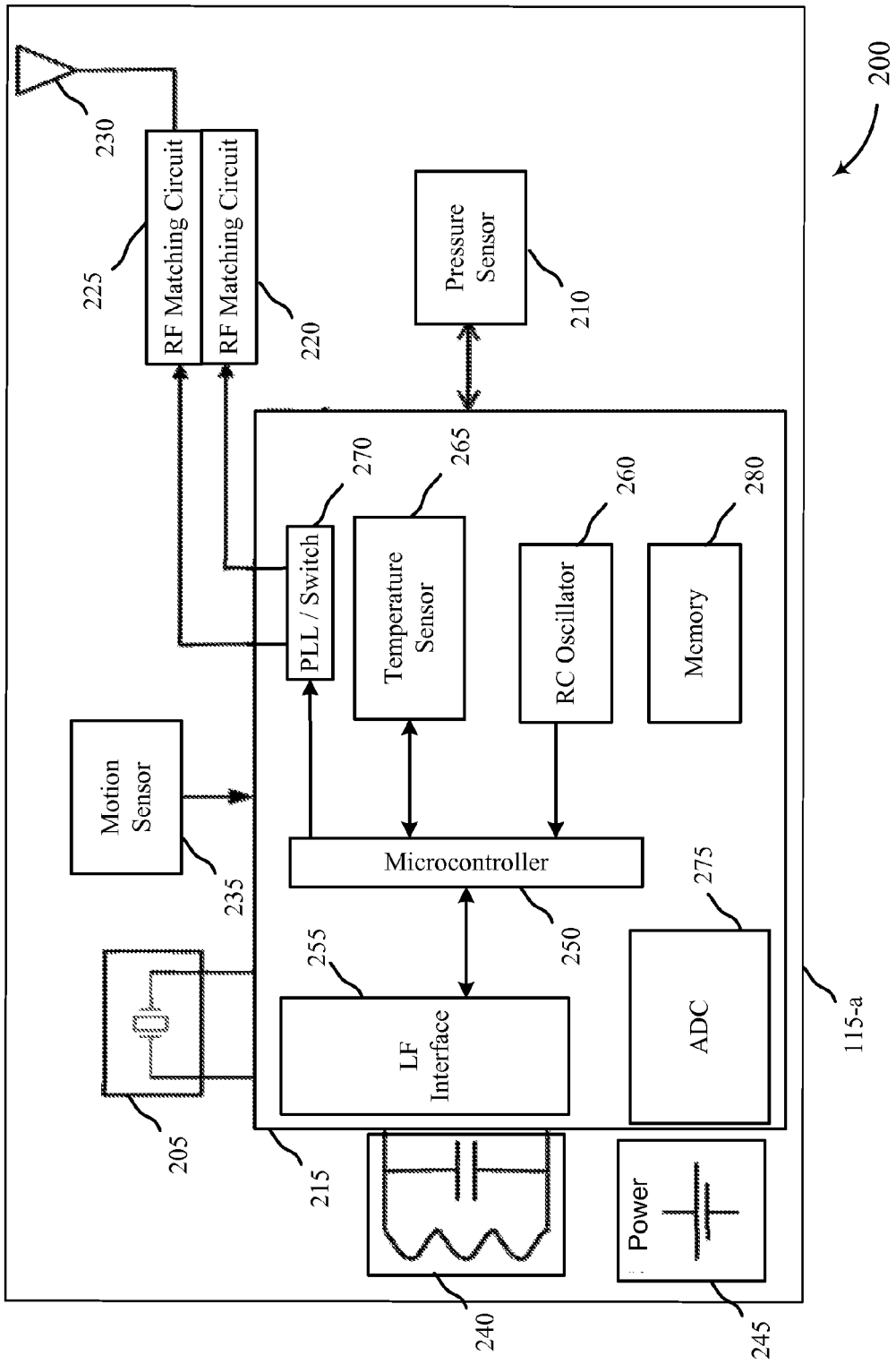
FIG. 2 shows a block diagram of an exemplary tire pressure detector in accordance with various embodiments.

With reference now to FIG. 2, a block diagram illustration 200 of a tire pressure detector 115-*a* in accordance with various embodiments is described. The tire pressure detector 115-*a* includes an external oscillator 205, which may be used to provide a reference frequency that is used in one or more RF components within tire pressure detector 115-*a*. A pressure sensor 210 may be used to sense pressure within a tire in which the tire pressure detector 115-*a* is mounted. A processing module 215 is coupled with the external oscillator 205 and pressure sensor 210, and is also coupled with RF matching circuits 220 and 225. An antenna 230 is coupled with the RF matching circuits 220 and 225, and transmits an RF signal from the tire pressure detector 115-*a*. In the example of FIG. 2, the tire pressure detector 115-*a* also includes a motion sensor 235, an external LF circuit 240 and a power source 245. Motion sensor 235 may be used initiate one or more various transmission from the tire pressure detector 115-*a* based on detected events from an accelerometer or other type of shock detection apparatus. LF circuit 240 may be used for receiving external inputs, and power source 245, such as a battery, may be used to provide power to the various components of tire pressure detector 115-*a*. Within the processing module 215, a microcontroller 250 is coupled with a low frequency (LF) interface 255, an RC oscillator 260, a temperature sensor 265, and a PLL/switch module 270. The processing module 215 of the example of FIG. 2 also includes an Analog to Digital Converter (ADC) 275, and a memory 280.

The LF circuit 240 and the LF interface 255 may receive information from an external device, for example the programming toll 510 and determine the required frequency for the PLL/Switch 270. RC oscillator 260 may be used to provide a signal to the microcontroller 250 in order to provide a clock signal for the microcontroller 250. Temperature sensor 265 may sense the operating temperature of the processing module 215, which may be used to compensate sensor readings and operating frequencies based on the sensed temperature. For example, temperature sensor may include a silicon-based temperature sensor that provides a signal that is used to adjust frequencies that may drift based on temperature of RF components or adjust readings provided from pressure sensor 210 that are calibrated based on temperature. PLL/switch module 270 may include an RF section that receives an input reference frequency as an intermediate frequency (IF) and modulates information onto the IF signal according to a particular protocol that is programmed into the device. The PLL/switch module 270 may output a high frequency RF at a selectable frequency signal through RF matching circuits 220, 225, and antenna 230, as will be described in more detail below.

As mentioned, the tire pressure detector 115-a may include an intelligent hardware device, e.g., a central processing unit (CPU), a microcontroller, an application specific integrated circuit (ASIC), or may be implemented as part of a reconfigurable device. The memory 280 may include random access memory (RAM) and read-only memory (ROM). The memory 280 may store computer-readable, computer-executable software code containing instructions that are configured to, when executed (or when compiled and executed), cause the tire pressure detector 115-a to perform various functions described herein. Various components of the processing module 215 may be implemented using one or more separate CPUs or ASICs, for example, and the components of module 215 may, individually or collectively, be implemented with one or more Application Specific Integrated Circuits (ASICs) adapted to perform some or all of the applicable functions in hardware. Each of the noted components may be a means for performing one or more functions related to operation of the system.

Figure 3:
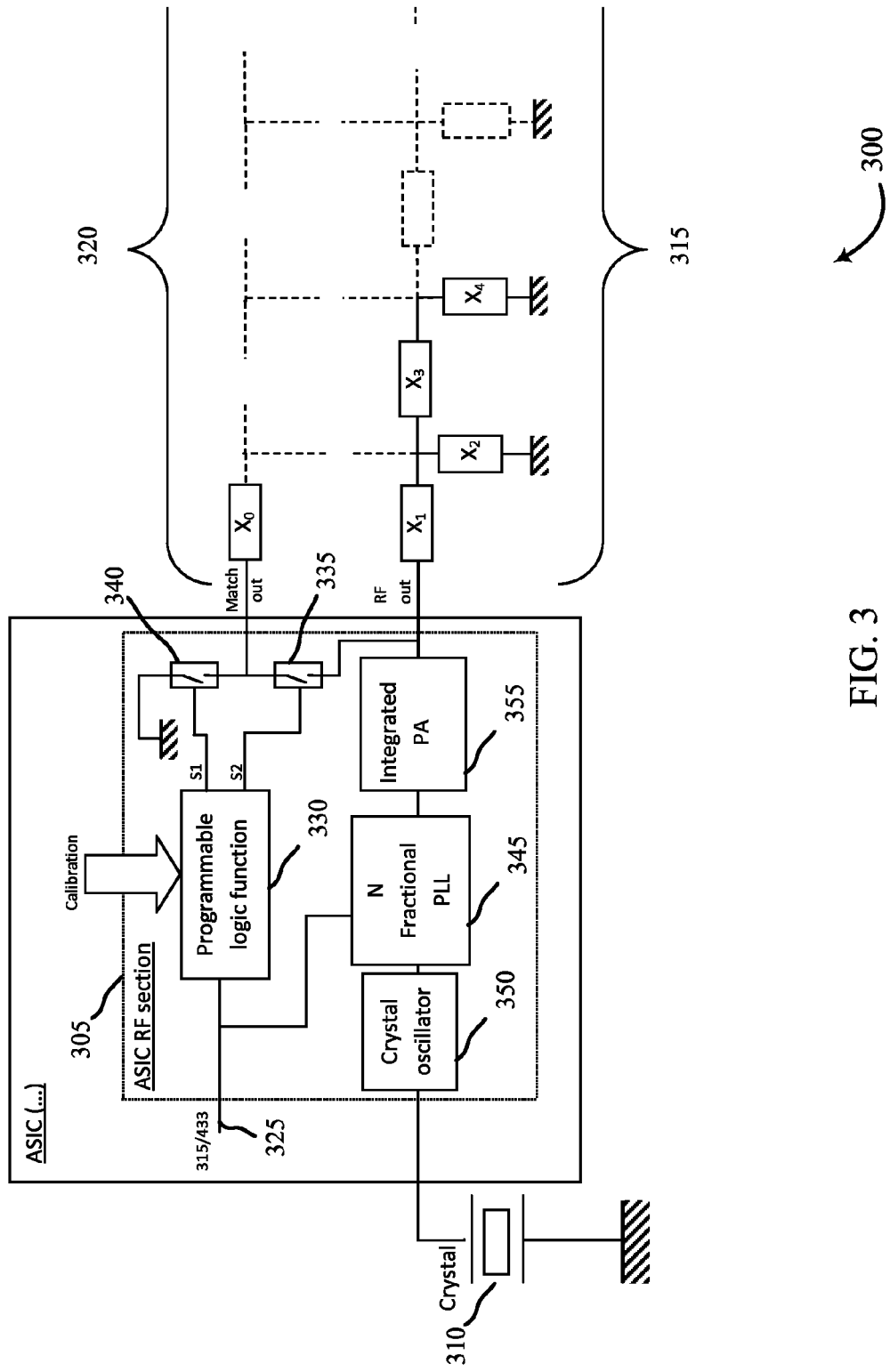
FIG. 3 shows a block diagram of an exemplary tire pressure detector RF section and associated RF matching circuits in accordance with various embodiments.

With reference now to FIG. 3, a block diagram illustration of an RF section 300 of a tire pressure detector in accordance with various embodiments is described. The RF section 300 of the example of FIG. 3 includes an ASIC RF section 305, which may be an example of PLL/switch module 270 of FIG. 2, and which is coupled with an external crystal oscillator 310, a first matching circuit 315, and a second matching circuit 320. First and second matching circuits may be examples of RF matching circuits 220 and 225 of FIG. 2, for example. ASIC RF section 305 includes a frequency select input 325 which may be used to change the final output frequency of the RF section 300. In some embodiments, the frequency select input 325 may be used to select a final output frequency of either 315 MHz or 433.92 MHz. The frequency select input 325 may be provided by, for example, microcontroller 250 of FIG. 2, and may be programmed into the tire pressure detector during initial configuration of the tire pressure detector. In some embodiments, an ASIC is configurable to operate at the selected frequency through a programming operation, as will be described in more detail below, that configures both the frequency and a protocol of the tire pressure detector.

ASIC RF section 305 includes a programmable logic function 330, which may receive the frequency select input 325 and is configured to open or close a first switch 335 and/or a second switch 340. In the example of FIG. 3, the first switch 335 is switched based on an output of the programmable logic function 330 to either connect first matching circuit 315 or both the first and second matching circuits 315 and 320 with components of an RF transmit chain that includes an N-fractional PLL 345, a crystal oscillator 350, and a power amplifier 355. The second switch 340 is also switched based on an output of the programmable logic function 330 to connect an input of the components of the second matching circuit 320 with a ground contact. The frequency select input 325 is also coupled with N-fractional PLL 345 and is used to select an appropriate multiplier that is used in the N-fractional PLL 345 to provide the desired frequency output. For example a crystal oscillator of 20 MHz would have a multiplier of 15.75 times to produce an output frequency of 315 MHz. A multiplier of 21.696 times would produce an output frequency of 433.92 MHz.

Similarly as discussed above, the ASIC RF section 305 may include an intelligent hardware device, e.g., a central processing unit (CPU), a microcontroller, an application specific integrated circuit (ASIC), or may be implemented as part of a reconfigurable device. The programmable logic function 330 may include random access memory (RAM) and read-only memory (ROM) which may include instructions that are configured to, when executed (or when compiled and executed), cause ASIC RF section 305 to perform various functions described herein. Various components of ASIC RF section 305 may be implemented using one or more separate CPUs or ASICs, for example, and the components of ASIC RF section 305 may, individually or collectively, be implemented with one or more Application Specific Integrated Circuits (ASICs) adapted to perform some or all of the applicable functions in hardware. Each of the noted components may be a means for performing one or more functions related to operation of the system.

Figure 4B:
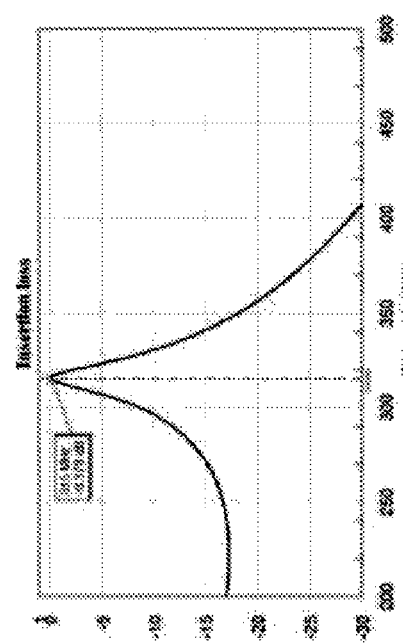
FIG. 4B shows a graph illustrating the RF insertion loss relative to frequency for the RF matching circuit of FIG. 4A.
Figure 4D:
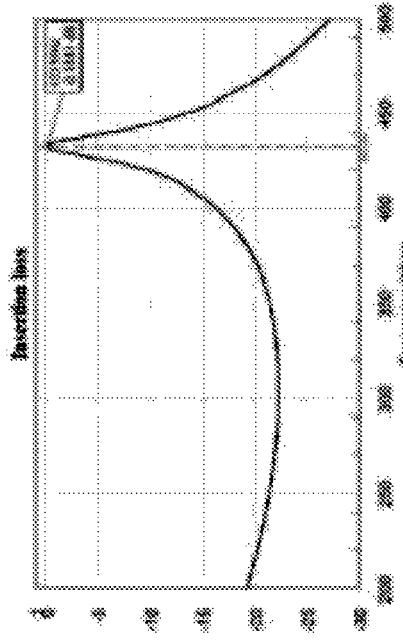
FIG. 4D shows a graph illustrating the RF insertion loss relative to frequency for the RF matching circuit of FIG. 4C.
Figure 4A:
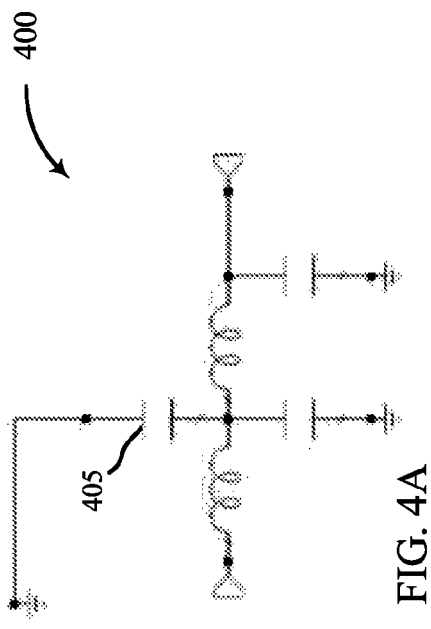
FIG. 4A shows a schematic diagram of an exemplary RF matching circuit.
Figure 4C:
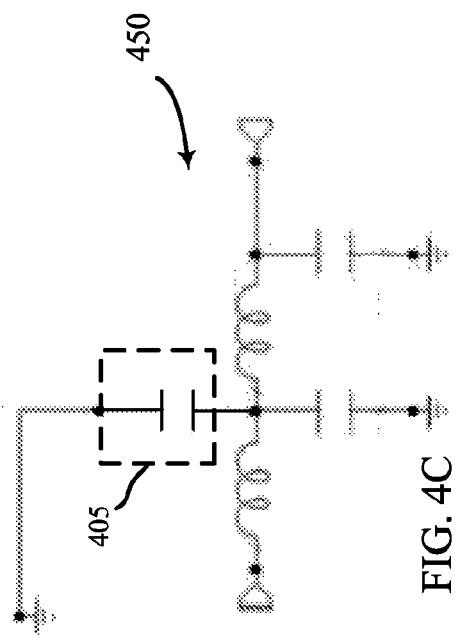
FIG. 4C shows a schematic diagram of another exemplary RF matching circuit.

With reference now to FIGS. 4A through 4D, matching circuits 400 and 450, respectively, are illustrated. In matching circuit 400 of FIG. 4A, a capacitor 405 is illustrated that is coupled with multiple inductor sand capacitors of an RF impedance matching circuit. In matching circuit 450 of FIG. 4C, the capacitor 405 is removed from the matching circuit. FIGS. 4B and 4D show graphs illustrating the insertion loss for each matching circuit 400 and 450, respectively. This provides one simplified example of switching one or more components to be coupled with a matching circuit to obtain the desired impedance matching based on a particular frequency of interest. Thus, switch elements may be provided in such circuits to switch in and out different matching circuit components to obtain a desired matching circuit impedance. Of course, it will be readily understood by one of skill in the art that one of a number of different selected frequencies may be obtained by providing the appropriate frequency select inputs to a PLL/switching module to produce a desired PLL output frequency and switch appropriate matching components to be coupled with a matching circuit to provide desired impedance matching characteristics for the matching circuit. Accordingly, the principles described herein are applicable to devices that may be configured to operate according to one of two or more different frequencies.

Figure 5:
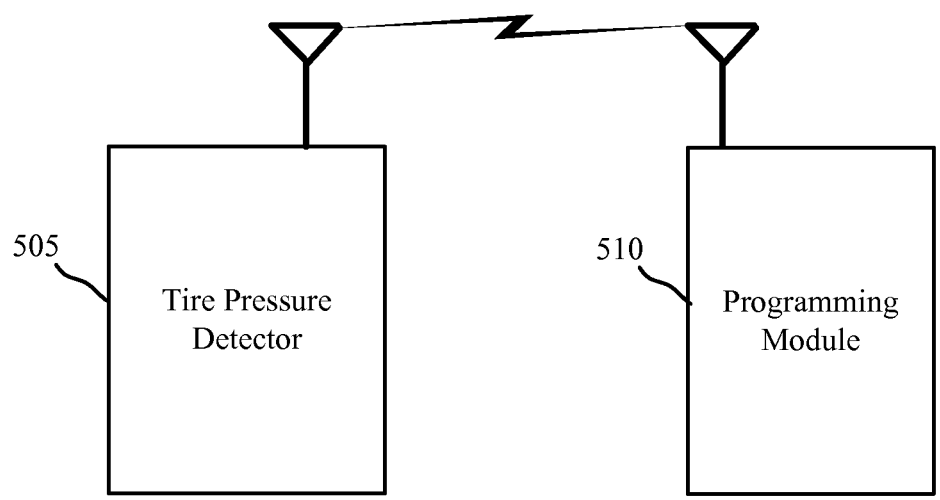
FIG. 5 shows a block diagram of a tire pressure detector and programming module system in accordance with various embodiments.

With reference now to FIG. 5, a block diagram 500 illustrates an example of a programming system that may be implemented in accordance with various embodiments. In FIG. 5, a tire pressure detector 505 may be programmed using a programming module 510. Tire pressure detector 505 may be, for example, a tire pressure detector 115 of FIG. 1 or 2, that is capable of operating at one of two or more selectable frequencies, and that is able to be programmed to modulate and transmit desired information according to one or two or more communications protocols. According to some embodiments, the tire pressure detector 505 and programming module are wirelessly connected, as illustrated in FIG. 5, and the tire pressure detector may be programmed and configured wirelessly. In other embodiments, the tire pressure detector 505 and programming module 510 may be coupled with a wired connection or through a docking type connection on the programming module 510 that may couple with contacts on the tire pressure detector 505 to provide configuration and programming for the tire pressure detector 505. In examples where a wireless connection is utilized, the wireless connection may be implemented through the same RF components that are used during final operations of the tire pressure detector 505, or through another wireless interface such as an inductively coupled wireless interface that may be incorporated into the tire pressure detector 505. In examples where the wireless connection is implemented through the same RF components that are used during final operations of the tire pressure detector 505, the tire pressure detector 505 may be manufactured and assembled to operate according to a first of the two or more selectable frequencies, which may be used for programming and configuration, which may reconfigure the tire pressure detector 505 to operate according to a different frequency than the initial frequency.

Figure 6:
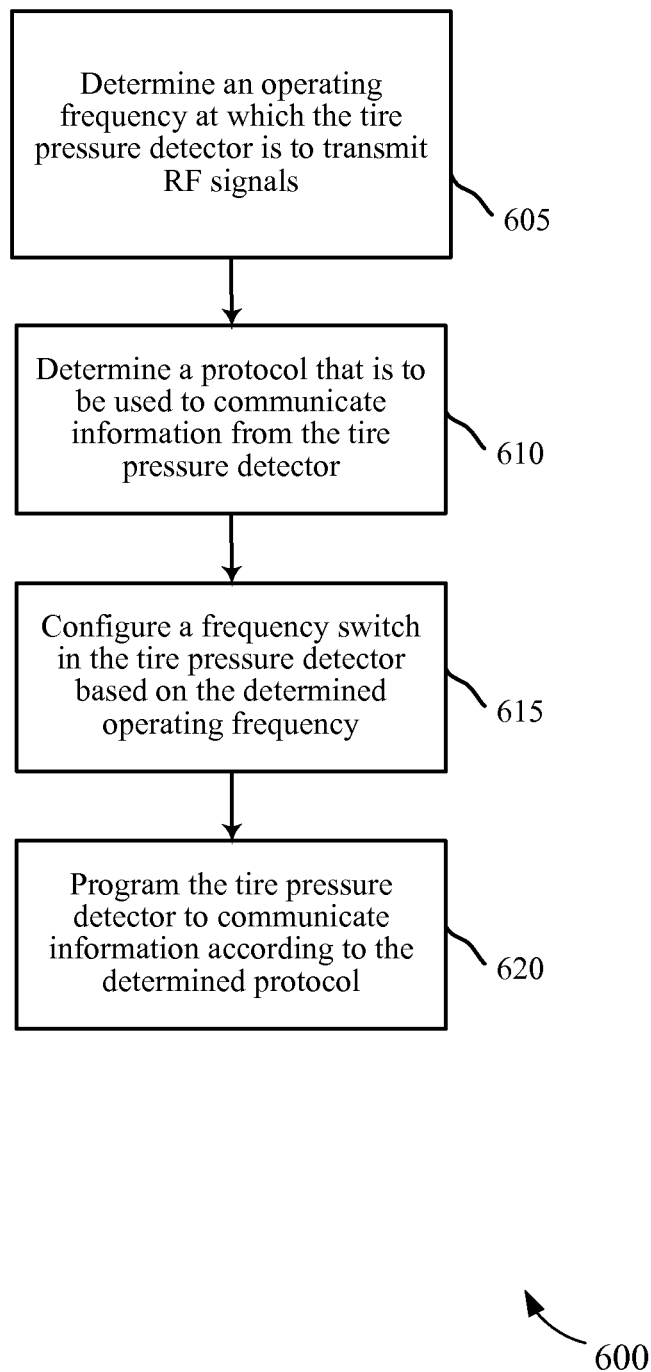
FIG. 6 shows exemplary operational steps of a method in accordance with various embodiments.

With reference now to FIG. 6, a flow chart illustrating the operational steps 600 of various embodiments is described. The operational steps 600 may, for example, be performed by one or more components of FIGS. 1-5, or using any combination of the devices described for these figures. Initially, at block 605, an operating frequency at which the tire pressure detector is to transmit RF signals is determined At block 610, a protocol that is to be used to communicate information from the tire pressure detector is determined As discussed above, the determination of operating frequency and protocol may be determined based on a particular vehicle that the detector is to be used with, and the particular frequency and protocol that the BCM of the vehicle uses, for example. At block 615, a frequency switch in the tire pressure detector is configured based on the determined operating frequency. The frequency switch may, for example, switch an input to a PLL circuit in the detector to output the operating frequency carrier signal, as well as switch an RF matching circuit to provide an impedance that provides that the power output from the detector RF communications is substantially the same between different selected frequencies. Finally, at block 620, the tire pressure detector is programmed to communicate information according to the determined protocol. Following the configuration and programming of a tire pressure detector, the device may be used in a vehicle to provide information related to tire pressure of an associated tire.

Figure 7:
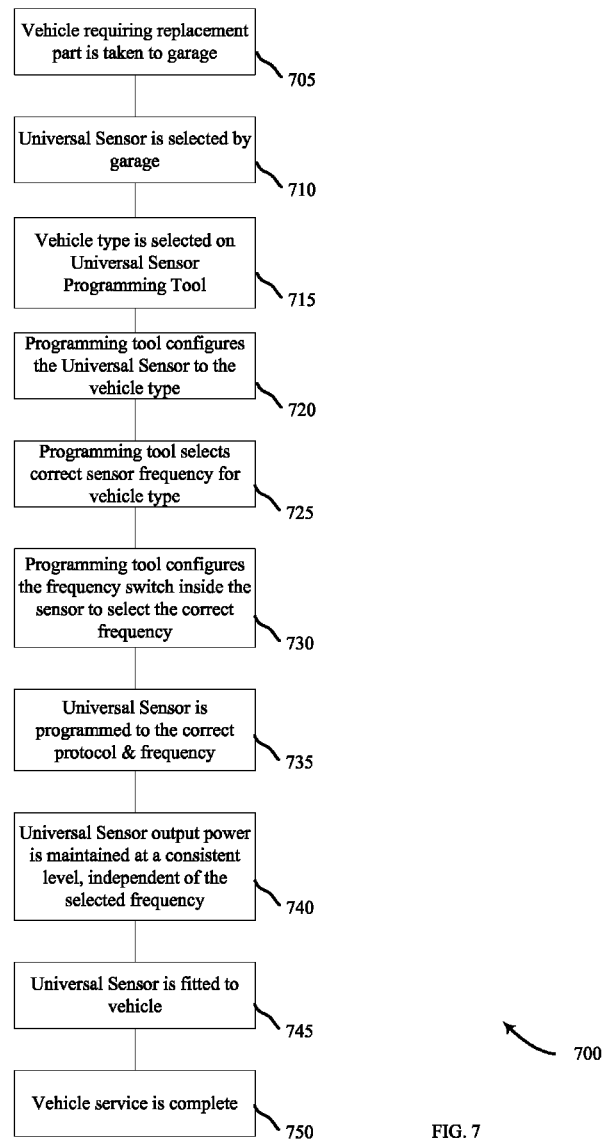
FIG. 7 shows exemplary operational steps of a method in accordance with other various embodiments.

With reference now to FIG. 7, a flow chart illustrating the operational steps 700 for programming and configuration of a tire pressure detector is described for various embodiments. The operational steps 700 may, for example, be performed by one or more components of FIGS. 1-5, or using any combination of the devices described for these figures. Initially, at block 705, a vehicle requiring a replacement tire pressure detector is taken to a garage or repair facility. At block 710, a universal tire pressure detector, such as described above, is selected by personnel at the garage. The universal detector that is capable of being configured to operate according to one or multiple frequencies and protocols allows for fewer parts to be stocked by the garage, rather than requiring the garage to stock a part for each frequency and then select the correct frequency part to be compatible with the vehicle being serviced. At block 715, the vehicle type (e.g., vehicle make and model) is selected on a universal sensor programming tool. In some embodiments, the universal sensor programming tool may include programming information for numerous different vehicle types, and may be periodically updated to receive current or updated information for different vehicle types. The programming information may include, for example, an operating frequency for a particular vehicle type and protocol information for the vehicle type.

The programming tool configures the universal tire pressure detector to the vehicle type, according to block 720. Without the universal tire pressure detector, if a replacement part having the wrong sensor frequency is selected then the programming tool will be unable to program the sensor, and the programming will fail. At block 725, the programming tool selects correct sensor frequency for vehicle type. At block 730, the programming tool configures a frequency switch inside the universal tire pressure detector to select the correct frequency. At block 735, the universal tire pressure detector is programmed to the correct protocol and frequency. The selection of the frequency may be accomplished as described above, for example, to configure an RF section of the detector to output a particular frequency and switch one or more RF matching circuit components to provide appropriate impedance matching between the RF section and an antenna for the selected frequency. The impedance matching provides a detector output power that is maintained at a consistent level, independent of the selected frequency, as indicated at block 740. At block 745, the universal tire pressure detector is fitted to vehicle. Optional testing may be performed to verify proper operation of the universal tire pressure detector, and then vehicle service is complete as indicated at block 750.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described components and techniques. These techniques, however, may be practiced without these specific details. In some instances, well-known structures and devices are shown in block diagram form in order to avoid obscuring the concepts of the described embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A tire pressure detection apparatus, comprising:
   a pressure sensor configured to output a pressure signal;
   a control module communicatively coupled with the pressure sensor and configured to modulate information related to the pressure signal onto an output signal, the output signal having a frequency that is selectable from at least a first frequency and a second frequency;
   an RF matching circuit coupled with the control module;
   an antenna coupled with the RF matching circuit; and
   a reference oscillator that outputs a reference signal at a predetermined frequency,
   wherein the control module comprises an RF sub-module configured to receive the reference signal and generate the output signal based on a multiplier applied to the reference signal, the value of the multiplier selectable from at least a first multiplier value corresponding to the first frequency and second multiplier value corresponding to the second frequency, and
   wherein the RF sub-module comprises a fractional-N Phase Locked Loop (PLL) circuit.

2. The apparatus of claim 1, wherein the RF matching circuit has an impedance that is selectable from at least a first impedance and a second impedance based on the frequency of the output signal.

3. The apparatus of claim 2, wherein the control module comprises a switch that is configured to switch the impedance of the RF matching circuit to the first impedance or second impedance based on the output signal frequency.

4. The apparatus of claim 3, wherein the RF matching circuit comprises a first set of matching components corresponding to the first impedance, and a second set of matching components selectively couplable, using the switch, to the first set of matching components to provide the second impedance.

5. The apparatus of claim 1, wherein at least one of the first multiplier value and the second multiplier value is a non-integer value.

6. The apparatus of claim 1, wherein the control module is programmable to output the first or second frequency.

7. The apparatus of claim 6, wherein the control module further comprises a programming interface communicatively couplable with a programming module that selects the output frequency of the control module.

8. The apparatus of claim 7, wherein the control module and programming module are communicatively couplable via a wireless interface.

9. A method for frequency selection in a tire pressure detector, comprising:
   determining an operating frequency at which the tire pressure detector is to transmit RF signals;
   determining a protocol that is to be used to communicate information from the tire pressure detector;
   configuring a frequency switch in the tire pressure detector based on the determined operating frequency, wherein configuring the frequency switch comprises selecting a multiplier at a fractional-N PLL circuit responsive to the determined operating frequency; and
   programming the tire pressure detector to communicate information according to the determined protocol.

10. The method of claim 9, further comprising:
    selecting an RF matching circuit to be used in RF signal transmission from the tire pressure detector responsive to the determined operating frequency.

11. The method of claim 10, wherein the selected RF matching circuit maintains a predetermined power output of the RF signal transmission independent of the determined operating frequency.

12. The method of claim 9, wherein determining the operating frequency comprises:
    determining a make and model of a vehicle associated with the tire pressure detector; and
    determining the operating frequency based on the make and model of the vehicle.

13. The method of claim 9, wherein determining the protocol comprises:
    determining a make and model of a vehicle associated with the tire pressure detector; and
    determining the protocol based on the make and model of the vehicle.

14. The method of claim 9, wherein the multiplier is a non-integer frequency multiplier applied to a reference oscillator output.

15. The method of claim 9, wherein configuring the frequency switch comprises:

configuring an RF module of the tire pressure detector to output an RF signal at the determined output frequency; and coupling an RF matching circuit between an output of the RF module and an antenna of the tire pressure detector responsive to configuring the RF module.

\* \* \* \* \*